July 19, 1938.   W. L. THAETE   2,124,155
FAUCET
Filed Jan. 15, 1937
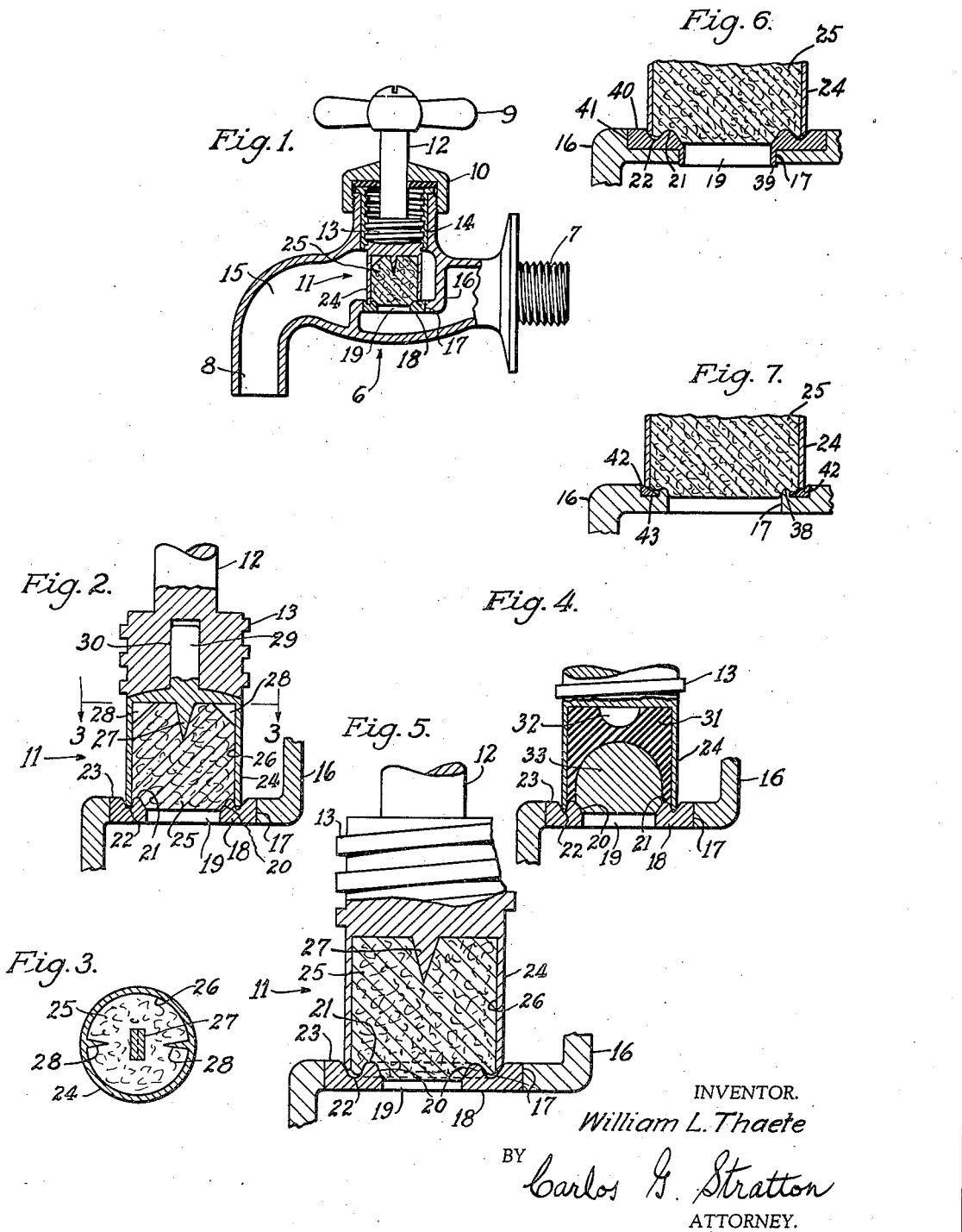

Patented July 19, 1938

2,124,155

UNITED STATES PATENT OFFICE 2,124,155

FAUCET

William L. Thaete, Trenton, Utah

Application January 15, 1937, Serial No. 120,685

11 Claims. (Cl. 251—27)

My invention relates to faucets, and more particularly to the valves and valve seats employed in faucets or other valve devices.

An important object of my invention is to provide a valve that eliminates the use of rubber washers and screws that have heretofore been employed to hold the washers in place.

Another object is to provide a valve having a non-metallic shut-off portion that is not rubber, whereby said valve may be used in conduits for oil, gasoline, kerosene, and the like.

Still another object is to provide a valve and valve seat that will have a metal-to-metal shut off that will automatically re-seat itself, to compensate for wear in the use of the valve.

A further object is to provide a valve that will afford a plurality of shut off means of different varieties in a single valve, whereby to have a very efficient shut off.

The invention also comprises novel details of construction and novel combinations and arrangements of parts, which will more fully appear in the course of the following description.

In the drawing, like reference characters designate similar parts in the several views.

Figure 1 is a vertical section of a faucet to which has been applied an embodiment of my invention.

Figure 2 is an enlarged, broken section showing more clearly the embodiment illustrated in Figure 1.

Figure 3 is a section taken on the line 3—3 of Figure 2.

Figure 4 is a sectional view similar to Figure 2, but showing a modified construction.

Figure 5 is a still further enlarged sectional view of a slightly different arrangement.

Figures 6 and 7 illustrate enlarged, broken sections of modified constructions.

Referring more in detail to the drawing, the reference numeral 6 generally designates a faucet comprising a threaded inlet neck 7, an outlet spout 8 and a handle 9 for operating a valve hereinafter more fully described. A usual packing nut is indicated at 10. The valve is generally designated by the number 11 and is manipulated by the handle through the intermediary of a valve stem 12. The stem is threaded at 13 for engagement with a tapped bushing 14 in the body of the faucet.

Conduit 15 through the faucet is divided by a partition wall 16. The partition 16 has an opening 17. An annular valve seat is provided circumferentially of the opening 17. The valve seat may be integral with the partition 16 (part of the valve seat is shown as integral at 38 in Figure 7), or the annular seat may be pressed into the opening 17, as shown at 18 in Figures 1, 2, 4 and 5, or an annular seat 40 may rest on the partition and have an annular lip 39 depending in the opening 17, as shown in Figure 6. It is preferred to employ harder metal for the seat (18, 40 or 42) than is used in the valve 11. The seat is, therefore, preferably of stainless steel, while the valve is of relatively softer metal.

The seat has a rolling or uneven face for engagement by the valve 11. Around a central opening 19 in the seat, in all forms shown except Figure 7, the surface of the seat rises at substantially a 75° angle to the horizontal, as shown at 20 in the drawing. Said face then presents an annular boss or crown 21 to the valve. The face then descends into an annular groove 22, at substantially a 75° angle, and then rises at approximately the same angle to a circumferential ridge 23.

In the preferred form of the valve 11, it has a shell 24 of relatively softer material than the valve seat and in which is pressed a non-metallic plug 25 of yielding material. The plug may be of wood, or other fiber, impregnated with resistant or preservative material, or the plug may be composed of elastic, synthetic rubber, whereby the plug will be unaffected by oil, gasoline, kerosene, and the like. A substance known in the trade as "Thiokol" may be used for the plug or for impregnating the fibrous plug.

The socket 26 formed by the shell 24 may be provided with a centrally disposed tapered pin 27 and sharp ridges 28 on the sides, whereby the plug 25 may be driven on the pin and ridges.

In the modification shown in Figure 2, the shell is made separately from the valve stem and has a shank 29 for driving into a recess 30 in the stem.

In the modified plug shown in Figure 4, the plug may be composed of rubber composition 31 disposed between a rounded boss 32 in the socket and a metallic face member 33. However, the rubber composition is exposed between the face member 33 and the shell 24 for engagement with the annular boss 21.

Figure 5 illustrates details of how the shell 24 preferably engages the angular, downwardly sloping side of the ridge 23. When the seat 18 is of stainless steel, such material will not rust, always affording a smooth contacting surface. Moreover, the shell 24 being of softer metal than the stainless steel seat 18, and contacting one with the other at a substantially 75° angle, wear on the lower edge of the shell will cause the valve to reseat itself. Initially, the lower edge of the shell 24 is slightly rounded.

The valve-engaging face of the seat 40 in Figure 6 is similar to that described in connection with the valve-engaging face of the seat 18. The only differences in the two forms of seats are that the seat 40 rests on the partition 16, against a shoulder 41, and has a depending annular lip 39 that is pressed down in the opening 17.

The form shown in Figure 7 comprises an annular seat 42 that has its valve-engaging surface at a 30° angle to the horizontal, considering the faucet in an upright position. This seat is also preferably of stainless steel. It may be die cast in the faucet, or the normal seat may be machined out, as suggested at 43, and the seat 42 pressed therein.

In operation, the present valve construction provides a three-way or plural shut-off means. Through use, the plug 25 will come to conform with the metallic seat 18, 40 or 42 although the plug may be initially made with grooves and ridges that are complementary to those on the seat. In the form shown in Figures 1, 2 and 6, the plug engages the face 20 around the opening 19 and engages the boss 21, providing one shut off. The plug also extends into the annular groove 22, providing a second shut off. The third shut off is the metal-to-metal contact of the shell 24 with the downwardly sloping face of the seat.

In the form shown in Figure 4, the rubber composition engages the boss 21, the face member 33 engages the face 20, and the shell 24 engages the downwardly sloping sides of the seat and the groove 22. In the form shown in Figure 5, the shell engages the sloping walls of the seat 18, without seating itself at the bottom of the groove 22, until worn down by use.

In the form shown in Figure 7, the relatively softer valve shell 24 and plug 25 wear down to conform with the relatively harder sloping seat 42.

The plug 25 is prevented from spreading or being distorted out of shape by means of the metallic shell 24, and the shell being comparatively thin, its expansion and contraction are negligible.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A faucet having ingress and egress conduits, comprising a valve having a shell of nominal thickness forming at its extremity a knife edge sealing element, a plug of yielding material in the shell, an apertured partition dividing the ingress conduit from the egress conduit, and an annular valve seat member resting on the partition around the aperture and having an annular lip pressed in the aperture and depending therein with respect to the seat, the valve seat having a portion of its valve-engaging face inclined and the valve seat member being of relatively harder material than the plug and shell, whereby the latter conform with the inclined seat member.

2. A faucet valve structure comprising a hardened annular valve seat; a shell having relatively thin walls forming at its extremity a valve face engageable with said valve seat, the relative area of said valve face and character of metal being such that the valve face tends to wear into sealing relation with said valve seat; and a plug of relatively soft material filling said shell and presenting a valve band materially greater in area than said valve face, said plug likewise adapted to wear into sealing relation with said valve seat.

3. A faucet valve structure comprising a hardened annular valve seat; a primary relatively wide valve face of relatively soft material, and a secondary relatively narrow valve face of relatively hard material, the secondary face surrounding the primary face, both valve faces formed from material which is softer than said valve seat and so proportioned that they tend in use to wear uniformly.

4. A faucet valve structure comprising a valve seat of corrugated form, defining at least two converging valve surfaces, and an intermediate valve surface; a valve closure comprising a shell of nominal thickness defining a substantially knife-edge valve face engageable with one of said converging valve surfaces; and a relatively soft filler in said shell having a valve face of substantial width and conforming to the remaining valve surfaces.

5. A faucet valve structure comprising a valve seat of corrugated form, defining at least two converging valve surfaces, and an intermediate valve surface; a valve closure comprising a shell of nominal thickness defining a substantially knife-edge valve face engageable with one of said converging valve surfaces; and a relatively soft filler in said shell having a valve face of substantial width and conforming to the remaining valve surfaces, both of said valve faces being composed of softer material than said valve seat, and their relative areas of contact being substantially in proportion to their relative softness whereby they tend to wear down at equal rates.

6. A faucet valve structure comprising a valve port bordered by a steeply beveled seat element; a valve closure including a shell having walls of nominal thickness defining at their extremities an annular relatively thin valve face engageable with said seat element and thereby swaged into sealing relation therewith, said seat element engageable with the outer side of said valve face and tending to constrict the area thereof; and a yieldable plug in said shell tending to resist the swaging action of said seat element.

7. A faucet having ingress and egress conduits, an apertured partition dividing said conduits, the partition affording a valve seat, a valve comprising a shell, a plug of yielding material in the shell, the seat and the shell having engaging tapered portions, the tapered portion of the shell being disposed within the tapered portion of the seat for swaging engagement of the one within the other, the yielding material of the plug yieldingly resisting swaging of the shell by the seat.

8. A faucet having ingress and egress conduits, an apertured partition dividing said conduits, the partition affording a valve seat, a valve comprising a shell, a plug of yielding material in the shell, the seat having diverging tapered portions, and the shell and plug having portions tapered in opposite directions to engage the divergingly tapered portions of the seat, to provide a plural shut-off.

9. A faucet having ingress and egress conduits, an apertured partition dividing said conduits, the partition affording a valve seat, a valve comprising a shell, a plug of fibrous material in the shell, the plug being impregnated with a preservative, the seat and the shell having engaging tapered portions, the material of the plug yieldingly resisting swaging of the shell by the seat, and the valve seat being of material relatively harder than the shell and plug.

10. A faucet valve structure comprising a hardened seat, a shell of relatively softer material providing a circumferential rim engageable with the seat, the comparative resistance of the shell and seat causing the shell to wear into sealing relation with the seat, and a plug in the shell also engageable with the seat, the plug being of relatively soft material and likewise adapted to wear into sealing relation with the seat.

11. A faucet valve structure having a valve port bordered by a steeply beveled seat and having a substantially horizontally disposed seat at the foot of said beveled seat, a valve closure including a shell engageable with the steeply beveled seat and thereby swaged into sealing relation therewith, and a relatively softer filler within the shell engageable with the substantially horizontally disposed seat.

WILLIAM L. THAETE.